US010293476B2

(12) United States Patent
Fleischmann

(10) Patent No.: US 10,293,476 B2
(45) Date of Patent: May 21, 2019

(54) STACK ARRANGEMENT AND TRANSPORT CONTAINER HAVING BUS INTERFACES

(71) Applicant: Festool GmbH, Wendlingen (DE)

(72) Inventor: Bernd Fleischmann, Weilheim (DE)

(73) Assignee: FESTOOL GMBH, Wendlingen (DE)

( * ) Notice: Subject to any disclaimer, the term of this patent is extended or adjusted under 35 U.S.C. 154(b) by 132 days.

(21) Appl. No.: 15/323,563

(22) PCT Filed: Jul. 13, 2015

(86) PCT No.: PCT/EP2015/066005
§ 371 (c)(1),
(2) Date: Jan. 3, 2017

(87) PCT Pub. No.: WO2016/008860
PCT Pub. Date: Jan. 21, 2016

(65) Prior Publication Data
US 2017/0165828 A1    Jun. 15, 2017

(30) Foreign Application Priority Data

Jul. 12, 2014  (DE) .................. 10 2014 010 377
Jul. 10, 2015  (WO) ............... PCT/EP2015/065905

(51) Int. Cl.
| H05K 5/00 | (2006.01) |
| B25H 3/02 | (2006.01) |
| B62B 1/14 | (2006.01) |
| B65D 85/00 | (2006.01) |
| H02J 7/02 | (2016.01) |

(52) U.S. Cl.
CPC .............. B25H 3/02 (2013.01); B62B 1/14 (2013.01); B65D 85/00 (2013.01); H02J 7/02 (2013.01)

(58) Field of Classification Search
CPC ..................................... H05K 5/00
See application file for complete search history.

(56) References Cited

U.S. PATENT DOCUMENTS

| 5,909,357 | A  | *  | 6/1999  | Orr ...................... G06F 1/16 |
|           |    |    |         | 361/679.46 |
| D592,423  | S  | *  | 5/2009  | Greiner ...................... D6/702 |
| 7,696,721 | B2 | *  | 4/2010  | Young ................... H02J 7/0068 |
|           |    |    |         | 320/107 |
| 9,829,953 | B2 | *  | 11/2017 | Reade ................... H02J 7/0042 |
| 2007/0274042 | A1 |  | 11/2007 | Jackson et al. |

(Continued)

FOREIGN PATENT DOCUMENTS

| DE | 10132831 A1 | 1/2003 |
| DE | 102008013588 | 9/2009 |

(Continued)

*Primary Examiner* — Jerry Wu
(74) *Attorney, Agent, or Firm* — Hoffmann & Baron, LLP

(57) ABSTRACT

A stack arrangement having at least two stack elements, which can be stacked on each other in a stacking direction, of which at least one is formed from a transport container which has a container body having a storage receptacle which has a machine receptacle for an electrical or pneumatic hand tool machine. The stacking elements have bus interfaces for transferring data and/or energy between the stacking elements of the stack arrangement, wherein the bus interfaces form a bus connection between the stack elements when the stack elements are stacked on each other.

17 Claims, 4 Drawing Sheets

(56) References Cited

U.S. PATENT DOCUMENTS

| | | |
|---|---|---|
| 2008/0303904 A1 | 12/2008 | Hsieh |
| 2009/0072029 A1 | 3/2009 | Martin |
| 2011/0006729 A1* | 1/2011 | Matthias ................ B25H 3/006 320/107 |
| 2011/0233096 A1 | 9/2011 | Michels et al. |

FOREIGN PATENT DOCUMENTS

| | | | |
|---|---|---|---|
| DE | 202010017022 | 4/2011 | |
| DE | 102011002409 A1 | 12/2011 | |
| DE | 202011107073 | 2/2012 | |
| DE | 102011007785 A1 | 10/2012 | |
| DE | 102011108416 A1 | 1/2013 | |
| DE | 102012213415 | 5/2013 | |
| DE | 202013002556 U1 | 6/2013 | |
| EP | 2551210 A1 * | 1/2013 | ............... B25H 3/02 |
| FR | 2946231 | 12/2010 | |
| WO | WO2013034340 | 3/2013 | |

* cited by examiner

STACK ARRANGEMENT AND TRANSPORT CONTAINER HAVING BUS INTERFACES

This application claims priority based on an International Application filed under the Patent Cooperation Treaty, PCT/EP2015/066005, filed Jul. 13, 2015, which claims priority to DE102014010377.3, filed Jul. 12, 2014 and PCT/EP2015/065905, filed Jul. 10, 2015.

BACKGROUND OF THE INVENTION

The invention relates to a stack arrangement having at least two stack elements which can be stacked on top of one another in a stacking direction, of which at least one is represented by a transport container having a container body and a storage receptacle with a machine receptacle for an electric or pneumatic hand-operated power tool.

Hand-operated power tools have long been transported in stackable transport boxes or transport containers, usually made of a plastic material. The transport containers can be stacked on top of one another and joined in a manner resistant to tension in a stacking direction, for example by links or the like, resulting in a column-type structure which is easily transported.

The transport containers of such a stack arrangement are mechanically linked to one another and protect the hand-operated power tool.

It is, for example, possible to charge a battery pack or the like inductively through the walls of the transport container or to route a cable into the transport container. This is laborious.

SUMMARY OF THE INVENTION

The present invention is therefore based on the problem of providing a transport container or a stack arrangement including such a transport container with an improved supply concept.

To solve this problem, it is provided in a stack arrangement of the type referred to above that the stack elements have bus interfaces for transmitting data and/or energy between the stack elements of the stack arrangement, wherein the bus interfaces form a bus connection between the stack elements when or after the stack elements are stacked on top of one another or in the stacked state of the stack elements. In the stacked state of the stack elements, in which at least two stack elements are stacked on top of one another, there is a bus connection between the two stack elements or further stack elements of the stack or the stack arrangement.

It could be said that the bus interfaces implement a bus connection in the stacked state of the stack elements.

To solve this problem, there is further provided a transport container for an electric or pneumatic hand-operated power tool having a container body with a storage receptacle in which a machine receptacle for the hand-operated power tool is accommodated, wherein the transport container can be used as a stack element for a stack arrangement, wherein the transport container can be stacked with its underside on a stack base, in particular a further transport container or a vacuum cleaner, and/or forms with its top side a stack base for a further stackable stack element, in particular a transport container, wherein the transport container has, for transmitting data and/or energy between the stack elements of the stack arrangement, at least one bus interface which, when the stack elements are stacked on top of one another or in the stacked state of the stack elements, forms a bus connection to a bus interface of the stack element placed below or above.

To solve this problem, a stack element is further provided. The stack element is designed as a stack base, for example. The stack element having a bus interface may, for example, be a vacuum cleaner, an insert for a shelf or the like, and a stack element in the form of a transport container, for example, can be stacked on top of the stack base.

The term "stack base" should, however, not be understood to be restricted to the lowest element of the stack or the stack arrangement, which is of course quite possible. It is also possible to understand the term "stack base" in a functional way, in a manner of speaking, i.e. as infeed interface and/or output interface for the bus connection of the stack arrangement. A stack base can therefore be not only the lowest element of the stack arrangement, but alternatively or in addition a topmost or middle element of the stack arrangement as well.

It is a basic idea of the present invention that the transport container or several transport containers are not only linked mechanically in the stacking direction, e.g. at least supported and preferably joined in a manner resistant to tension in the stacking direction, for example by coupling elements, links, fixed or movable hooks or the like, but in addition provide a bus connection between individual stack elements, e.g. a stack base and a transport container placed thereon, or between several transport containers of the stack arrangement. The bus connection, for example, facilitates the transmission of data and/or energy or the like. The transport containers are therefore arranged in a row or in the stacking direction next to or on top of one another and communicate with one another and/or with a stack base via the bus connection.

A connection with tensile and/or shear strength between at least two stack elements of the stack arrangement can also contribute to an optimised bus connection between the stack elements. The bus couplers or bus interfaces of the stack elements are advantageously held in a stable position relative to one another by coupling means connecting the stack elements in a manner resistant to tension in a stacking direction and/or by positive-locking contours of the stack elements providing positive engagement transverse to the stacking direction. The positive-locking contours, for example, include hooks and hook receptacles, plug-in projections and plug-in receptacles or the like. Such positive-locking contours are, for example, located on a container body and/or a cover of a respective transport container. Such positive-locking contours may, however, alternatively be provided on the top and/or the underside of a stack element sandwiched between transport containers.

The stack base may be a vacuum cleaner, for example. It is, however, also possible for the stack base to be represented by a transport container. The stack base can furthermore be provided by a shelf base, i.e. a piece of storage furniture. The shelf base may be installed into a motor vehicle, for example.

By means of the bus connection, a communication can be established in a very simple way without the operator having to take any special measures. A bus connection offers the particular advantage that a minimum of individual lines have to be connected to one another and that several existing bus lines can be connected to one another in a single operating step, i.e. by connecting the bus interfaces to one another.

The bus interface of the transport container is expediently connected to a machine interface for the connection of a service interface of the hand-operated power tool, or it may comprise the machine interface. The service interface therefore is the machine-side interface, while the machine interface is the interface of the transport container. The machine interface is provided for transmitting data and/or electric energy and/or compressed air from and to the hand-operated power tool. Data, energy and the like can therefore reach the service interface of the hand-operated power tool from the bus interface via the machine interface. Each of the interfaces can be either hard-wired or wireless.

A stack element does, however, not necessarily have to provide a branch of the bus connection for the or a hand-operated power tool in all cases. In a variant of the invention, it may, for example, be provided that the at least one stack element of the stack arrangement has mutually connected bus interfaces which are provided for transmission with a lower or an upper stack element, so that the stack element located in the stack arrangement establishes the bus connection between the upper and the lower stack elements. As a result, the sandwiched stack element is only a transmission element for the bus in a manner of speaking. In this variant, it may likewise be provided that the bus of the sandwiched transport container or stack element has a branch, i.e. a connection to the above-mentioned machine interface. It is, however, also conceivable that such a transport container or stack element is merely looped through the bus connection without influencing it.

The machine interface expediently comprises a wireless transmission interface for the wireless transmission of data and/or energy and/or connecting contacts for establishing a contact-based connection to the hand-operated power tool. With wireless communication, data, electric energy or the like can be transmitted, for example. Contact-based or line-based transmission is particularly suitable for energy transmission. In this manifestation of the invention, it is therefore provided that the service interface of the hand-operated power tool is connected to the machine interface via electric contacts, for example.

A wireless communication or machine interface, in particular an inductive machine interface, facilitates inductive loading, a transmission via Bluetooth, WLAN or the like.

The bus connection may be wireless or hard-wired or even both.

It is, for example, possible to transmit data over a wireless link, while energy is transmitted via wires or electric contacts. If therefore the electric contact between two stack elements of the stack arrangement is broken, for example, this does not affect the energy supply of, for example, the hand-operated power tool in a transport container, unless it would at the same time provide power for work. If, however, only a battery is charged, for example, the flow of energy can be broken for a short time. In data transmission, it is advantageous, for reasons of data security, reliability of data transmission and the like, if the connection(s) is/are not broken too readily. In this case, the wireless transmission or wireless bus connection is therefore preferred.

It is particularly preferred, however, if the bus connection is exclusively wireless. Particularly preferred is an inductive energy transmission in the bus connection or between the bus interfaces respectively.

The bus interface of a transport container expediently comprises at least one inductive coupling means for the inductive transmission of energy and/or data. The bus interface can, for example, be configured for the inductive transmission of energy or data to an adjacent bus interface and/or for receiving inductively transmitted energy or data from an adjacent bus interface. The coupling means therefore comprises a transmission coil.

The wireless transmission between bus interfaces comprises a radio transmission or an optical transmission, for example via WLAN, Bluetooth, infrared or the like. The respective bus interface therefore comprises optical communication means and/or radio communication means, for example. The communication means may be or comprise pure reception means, pure transmission means or, in a particularly preferred configuration, be designed for both reception and transmission.

A particularly preferred embodiment of the invention provides that the stack elements of the stack arrangement communicate with one another exclusively by wireless means. There is no risk of damage to electric contacts.

A contact-based bus connection is also possible, however.

The bus interface expediently comprises electric contact surfaces, which are in particular located on plug connectors, on the top side of a lower stack element and on the underside of an upper stack element stacked on top of the former. The contact surfaces—which do not have to involve plug connectors, but may be flat surfaces or spring-loaded elements—are expediently oriented on the underside or on the associated top side in such a way that they quasi-automatically establish the bus connection as the stack elements are stacked. In this case, the operator only has to stack the stack elements on top of one another while at the same time establishing electric contact connections for the bus connection.

The insertion axis of plug connectors expediently extends parallel to the stacking direction, so that the plug connectors can be plugged into one another by stacking one stack element on top of another stack element. If, for example, a transport container is stacked on top of the stack base or another transport container, the operator plugs the plug connectors into one another at the same time. The plug connectors can, however, provide a mechanical security in addition, for example by locating or positively holding the stack or the stack arrangement transverse to the stacking direction.

The following measure is advantageous both in contact-based transmission of data and/or energy between or via the bus interfaces and in wireless transmission of data and/or energy.

It is expediently provided that the bus interfaces are in alignment with one another in the stacked state of the stack elements. Opposite coupling means designed for wireless energy and/or data transmission in particular, for example, of mutually communicating bus interfaces of adjacent stack elements, such as coils, transmitting aerials and receiving aerials and/or electric contacts, are in alignment with one another. The cross-sections of such coupling means, for example coils or aerials, expediently overlay one another precisely or at least substantially. Transverse to or relative to the stacking direction, there is expediently no offset or at most a minimum offset.

In the case of electric contacts, it has already become clear that their local location or positioning is advantageous when bus interfaces of stacked stack elements communicate with one another. But even in the case of inductive or other wireless transmission, it is advantageous if the bus interfaces are in alignment and/or overlay one another at least substantially and/or have only a minimum, if any, lateral offset relative to the stacking direction. Transverse to the stacking direction, there is expediently only a minimum, if any, offset between the bus interfaces of adjacent or stacked stack elements. Inductive coils for inductive power and/or data transmission or aerials for power and/or data transmission are in alignment, for example. This can ensure and facilitate an optimum or favourable efficiency and/or an optimum or favourable data and/or energy transmission quality.

It is advantageously provided that coupling means of bus interfaces of adjacent stack elements designed for wireless communication, for example coils or transmitting and receiving aerials, which are provided for energy and/or data transmission and are located opposite one another or assigned to one another, are located directly on mutually opposite walls or wall regions of the respective stack elements, for example transport boxes.

The bus interfaces expediently comprise at least one link which joins an upper stack element to a lower stack element of the stack arrangement and is in the assembled state joined to a side wall section of the container body of the upper stack element and preferably to a side wall section of the container body of the lower stack element as well. The link may, for example, be an electric connecting plug which establishes only the electric connection but does not provide a mechanically loadable coupling. It is, for example, conceivable that a flexible connection is provided between two plug contacts of a plug connector, each of which engages with one of two stacked stack elements. It is, however, advantageous if a fixed line connection is provided, so that the plug connector or the link in addition provides mechanical security for the stack arrangement in the stacking direction, i.e. resistance to tension in the stacking direction.

The at least one link is expediently mounted movably on one of the stack elements, being therefore captive. The mounting can, for example, be rotary, linear or a combination thereof. In addition, the link advantageously has plug-in means for plugging into at least one of the stack elements. It is, for example, possible to provide a link which is movably mounted on one of the transport containers or stack elements on the one hand and can releasably be plugged into another stack element placed above or below. It is, however, also possible to provide a link which is, for example, inserted from the side into the directly stacked stack elements in the manner of a bridge or a U-shaped part.

Particularly preferred is an embodiment of the invention in which the at least one link comprises an in particular rotatably mounted lock element which locks together two stack elements in a locking position and releases the stack elements in a release position. In the locking position, the lock element is in electric contact with bus contacts of the stack elements joined by the lock element, connecting them electrically. In a release position, the lock element is disengaged from the bus contacts or out of contact at least with the bus contacts of one of the two stack elements. The lock element can be a swivel lock, a slide lock or a lock which is mounted both pivotably and slidably. It expediently has a dual function, on the one hand locking the stack elements to one another, in particular against a release from the stack arrangement, and on the other hand establishing the bus connection.

At least one of the stack elements or transport containers expediently has a wireless or line-based feed-in interface, for example a connection for an electric energy network, so that electric energy, compressed air or the like, for example, can be fed in via the feed-in interface.

At least one of the stack elements, in particular the stack base or a transport container, expediently also has a communication interface for wireless or line-based communication or for wireless or line-based connection of the bus connection to a communication network, for example a local area network, or for communication with a control. Via the communication interface, a control, for example, in particular a smartphone or a computer, gains access to the bus connection, so that it can communicate via the bus connection with the stack arrangement and expediently with the hand-operated power tool placed or stored therein as well.

The control can, for example, be used to read operating states, status information or the like from a memory of the respective hand-operated power tool via the bus connection or the bus of the stack arrangement. Parameterisation, for example presetting maximum speeds or the like, is, however, also possible via the bus connection, i.e. the control or the computer can gain access to a control unit or a memory of the hand-operated power tool, for example via the bus connection, the machine interface or the service interface, for parameterising purposes.

The feed-in interface or the communication interface expediently comprises a receptacle or socket.

The communication interface can further comprise a function interface, an infrared interface, a WLAN interface or a Bluetooth interface. Line-based communication is also possible.

The stack element having the feed-in interface or the communication interface is preferably the stack base, for example a vacuum cleaner, the shelf base mentioned above or a stack base placed on the shelf base. It is, however, also possible that a feed-in interface or a communication interface or both is/are located on a transport container suitable for transporting a hand-operated power tool.

The feed-in interface expediently comprises a provision device for the provision of a supply voltage using the electric energy or compressed air fed in via the feed-in interface, the supply voltage being suitable for an electric hand-operated power tool stored in the stack arrangement. In other words, a compressed air converter or a pneumatic drive, for example, can be provided for an electric energy generator. Electric energy conversion is preferred, however, for example via an inductive or electronic transformer.

The transport container expediently comprises at least one charging station for the hand-operated power tool and/or an energy store which is separate from the hand-operated power tool, for example a battery pack. It is, for example, provided that the hand-operated power tool or the energy store is charged by wireless means, i.e. preferably inductively. Contact-based charge is, however, possible as well, i.e. charging contacts may be provided, for example. The charging station may conceivably have connecting cables which can be plugged into corresponding connecting contacts, such as supply sockets of the hand-operated power tool or the energy store. In a particularly preferred embodiment, a battery or energy store can remain in a machine when being charged via the charging station. An auxiliary charging location, for example for a spare energy store or battery, is preferably provided as well.

The inventive concept further facilitates the effective utilisation of sensor systems.

The transport container preferably comprises at least one sensor for the detection of an operating status, for example a number of operating hours, a service interval and/or information on a malfunction. A charging state of an energy store of the hand-operated power tool can also be detected via the sensor. The sensor may for example comprise a radio module for wireless communication with a control unit or a memory of the hand-operated power tool or the energy store.

It is preferred if the transport container additionally comprises a store for consumables such as abrasives, working tools (drills, cutters, saw blades etc.) or the like. It is particularly preferred if a sensor is provided for detecting the amount of consumables present in the transport container. Consumables can be detected optically and/or inductively and/or capacitively.

It is further expedient if a sensor is provided for the detection of a malfunction and for the generation of malfunction information. If the hand-operated power tool or its energy store, for example, announces by way of a red signal or another similar coloured signal that there is a malfunction, the sensor may, for example, be an optical sensor and detect the respective colour to report a malfunction.

It is also preferred if at least one stack element of the stack arrangement comprises a location device for the wireless location of the stack element or the stack arrangement as a whole, using a control such as the above-mentioned smartphone. The location device may be a position sensor, for example.

In the case of the or an transport container, it is advantageous if the machine receptacle is provided in a container insert which is supported on a base of the stowage receptacle and can be secured against movement along the base with fastening means and/or is supported on at least one circumferential side wall which laterally bounds the stowage receptacle.

The container insert is expediently provided with connecting means which are connected to the bus interface if the container insert is placed in the stowage receptacle and which are provided to establish a connection to the hand-operated power tool. At the stowage receptacle, there is advantageously provided an insert interface, while a body interface is expediently provided on the container insert; these are provided for the transmission of data and/or electric energy and/or compressed air when the container insert is placed in the stowage receptacle. The connecting means communicate with the machine interface described above, for example. In other words, it is advantageous if a connection can be established via the exchangeable container insert between the bus on the one hand and the service interface or the hand-operated power tool as a whole on the other hand.

The connecting means expediently comprise electric contacts which are capable of establishing a releasable electric connection to contacts of the bus interface. These contacts are then connected to bus lines, for example. When the container insert is inserted or installed into the stowage receptacle, the electric contact between the connecting elements and the bus connection, for example the bus contacts, is preferably established at the same time. It is also possible for the connecting means to be configured for wireless, e.g. inductive, data or energy transmission.

It should be noted, however, that it is obviously possible to provide a non-active or electrically non-conductive container insert which is not linked to the bus connection or the bus interfaces.

In this context, it is a basic idea that the container insert is individually designed for the hand-operated power tool, for example that the machine receptacle has positive-locking contours which preferably match the external contour of the hand-operated power tool with perfect fit. At the same time, further functions can be provided, i.e. data, electric energy or compressed air, for example, can reach the hand-operated power tool via the container insert or can be transmitted or output by the hand-operated power tool. Devices which individually match the hand-operated power tool can, for example, be provided on the container insert, for example a charging station, a communication interface (wireless, line-based or both) for communication with a service interface of the hand-operated power tool or the like. These devices are ideally placed in a location of the container insert which matches the requirements of the respective hand-operated power tool, for example close to a battery, a memory or a control unit of the hand-operated power tool or the like.

At the bottom, the container insert can be directly supported on the base. It is, however, also possible to place the container insert at a distance from the base while still supporting it. The container insert can, for example, be supported by at least one side wall relative to the base. It is e.g. possible that at least one support projection extends from the side wall at a distance from the base to support the container insert. The circumferential side wall can be an external wall of the transport container. It is also possible to provide an internal wall of the transport container as the or a circumferential side wall supporting the container insert.

It is advantageous if at least one machine interface for connection to a service interface of the hand-operated power tool is provided on the container insert, the machine interface being connected to the body interface for the transmission of data and/or electric energy and/or compressed air from and/or to the service interface. The machine interface provides the above-mentioned charging station, for example, or facilitates a parameterisation or service check of the hand-operated power tool and/or of its energy store or an energy store which is not located on the hand-operated power tool.

The transport container preferably comprises a wireless or line-based feed-in interface connected to the body interface, for example a connection for an electric energy network (e.g. mains cable), for feeding in electric energy, compressed air or both. The body interface is furthermore preferably provided with a communication interface for wireless or line-based connection to a communication network, for example a local area network, and/or for communication with a control. As it were, the transport container can be externally supplied with electric energy, compressed air or the like for the hand-operated power tool or a piece of equipment of the transport container, the container insert providing the bridge between the transport container or the feed-in or communication interface on the one hand and the hand-operated power tool or its service interface on the other hand.

The transport container preferably comprises an identification device for identifying the hand-operated power tool and/or the transport container and/or the container insert. The identification device can detect, by wireless means, optically or the like, which type of hand-operated power tool, transport container or container insert is present. A serial number, for example, can be read out in this way as well.

It is possible for a bar code, a radio module or the like to be provided on the container insert, by means of which the container insert can be identified.

The transport container expediently comprises a cooling apparatus for the hand-operated power tool, in particular an electric energy store of the hand-operated power tool or an electric energy store as such (not connected to the hand-operated power tool, e.g. a spare battery). The cooling apparatus, which may be a fan, a thermoelectric cooling element or the like, is, for example, located on the container insert or another location of the transport container.

The container insert could permanently remain in the stowage receptacle, i.e. be bonded or bolted into the stowage receptacle or installed by similar means. It is, however, preferred if the container insert is releasably located in the stowage receptacle, so that it can be exchanged easily. The container insert can, for example, be inserted into the stowage receptacle in the manner of a plug-in part. In other words, the stowage receptacle is preferably designed as a plug-in receptacle.

To hold a container insert in a respective stowage receptacle of a transport container, clamping means, latching means or other fasteners can be provided. At least one retaining clamp, at least one retaining hook, at least one latching hook or the like can, for example, be provided to locate a container insert in the stowage receptacle. In a simple latching operation, for example by pressure on a latching projection, the container insert can then be removed from the stowage receptacle. Bolting using one or more screws is readily conceivable as well.

At this point, it should be noted that two or more container inserts can obviously be installed into the stowage receptacle in a stationary and/or positive-locking manner. It is, for example, conceivable for the transport container to have several compartments into each of which a container insert can be installed. It is, however, also possible that all or at least two of the container inserts support one another, thereby gaining a secure hold in the stowage receptacle. In this context, it is conceivable that at least one inner container insert is surrounded by container inserts which are supported on the circumferential wall without, however, itself being supported on the circumferential wall.

The transport container preferably forms a part of a system in which a container insert of a first type with a machine receptacle matching a hand-operated power tool of a first type, i.e. a machine receptacle of a first type, or a container insert of a second type with a machine receptacle matching a hand-operated power tool of a second type can optionally be located in the stowage receptacle. The body interfaces of the container inserts are arranged at least substantially at the same point relative to the insert interface when the respective (first and/or second) container insert is placed in the stowage receptacle.

The container inserts expediently comprise machine interfaces for the hand-operated power tool, which are quasi-standardised or individually adapted. The machine interface of the container insert of the first type is adapted to the hand-operated power tool of the first type, for example by a predetermined wireless interface (e.g. Bluetooth, WLAN or the like) and/or functionally (e.g. type of communication with the hand-operated power tool) and/or locally (e.g. arrangement of contacts or wireless transmission elements). The machine interface of the container insert of the second type differs from the machine interface of the first type in at least one characteristic and is in any case adapted functionally and/or locally to the hand-operated power tool of the second type. The machine receptacles of the two container inserts may be either identical or different. If, for example, a second hand-operated power tool with an extended functionality or a functionality different from that of a first hand-operated power tool is to be accommodated in the transport container, the operator uses the suitable first or second container insert, one container insert facilitating radio transmission, for example, while the other provides a contact-based transmission of data and/or energy.

The stowage receptacle is preferably bounded by circumferential side walls and accessible through a stowage receptacle opening on a top side of the container. The container may be open at the top, for example. One embodiment provides that a handle projects rigidly upwards in front of the stowage receptacle opening. It is, however, also possible that the transport container advantageously has a cover for closing the stowage receptacle opening.

The transport container can preferably be used as a stack element for a stack arrangement, wherein its underside can be stacked on top of a stack base, such as a further transport container, a vacuum cleaner or the like, and/or wherein its top side forms a stack base for a further stackable element, such as a further transport container, in particular of the type according to the invention.

The stack elements of the stack arrangement can preferably be linked or coupled to one another in a manner resistant to tension in the direction in which they are stacked, for example by suitable positive-locking engagements, coupling elements, locks, links or the like. This is shown more clearly in the drawing. Furthermore, positive-locking contours which hold the stack elements in engagement transverse to the stacking direction, i.e. are shear resistant transverse to the stacking direction, are advantageous as well.

For the transmission of data and/or energy between the stack elements of the stack arrangement, the transport container is preferably provided with at least one bus interface connected to the body interface. When the stack elements are stacked on top of one another, the bus interface forms a bus connection to a bus interface of the stack element placed below or above. As a result, energy and/or data can be transmitted via the bus or the bus connection to the body interface and from there to the insert interface and further to the machine interface.

BRIEF DESCRIPTION OF THE DRAWINGS

An embodiment of the invention is explained below with reference to the drawing, of which.

DETAILED DESCRIPTION OF THE PREFERRED EMBODIMENTS

Figure 1:
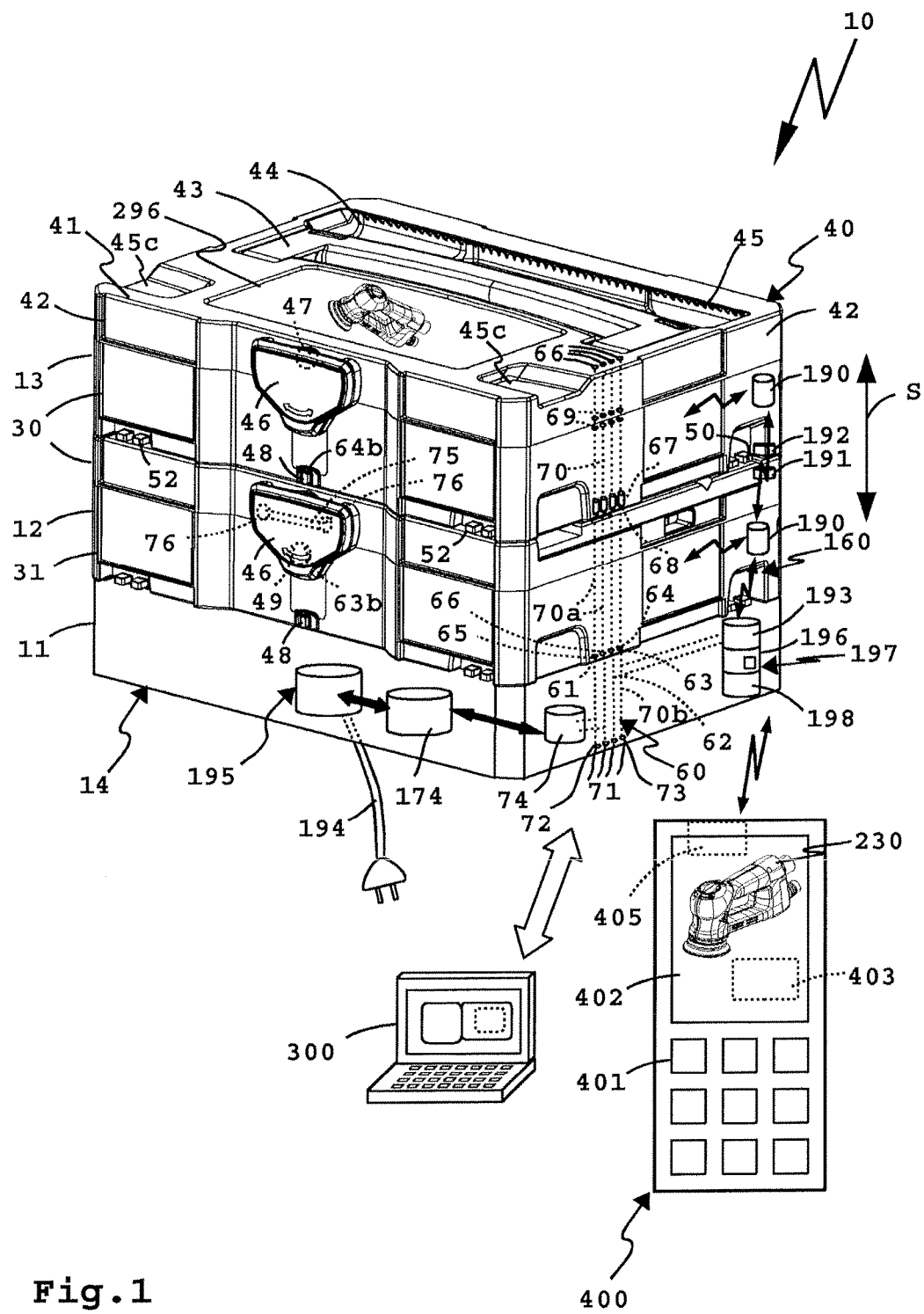
FIG. 1 shows a stack arrangement with a stack base and two transport containers as stack elements.

By way of example, the stack arrangement 10 comprises stack elements 11, 12, 13, which are stacked on top of one another and firmly joined to one another, in any case the two upper stack elements 12 and 13. The lower stack element 11 forms a stack base 14, on top of which the stack elements 12 and 13 are stacked.

Figure 2:
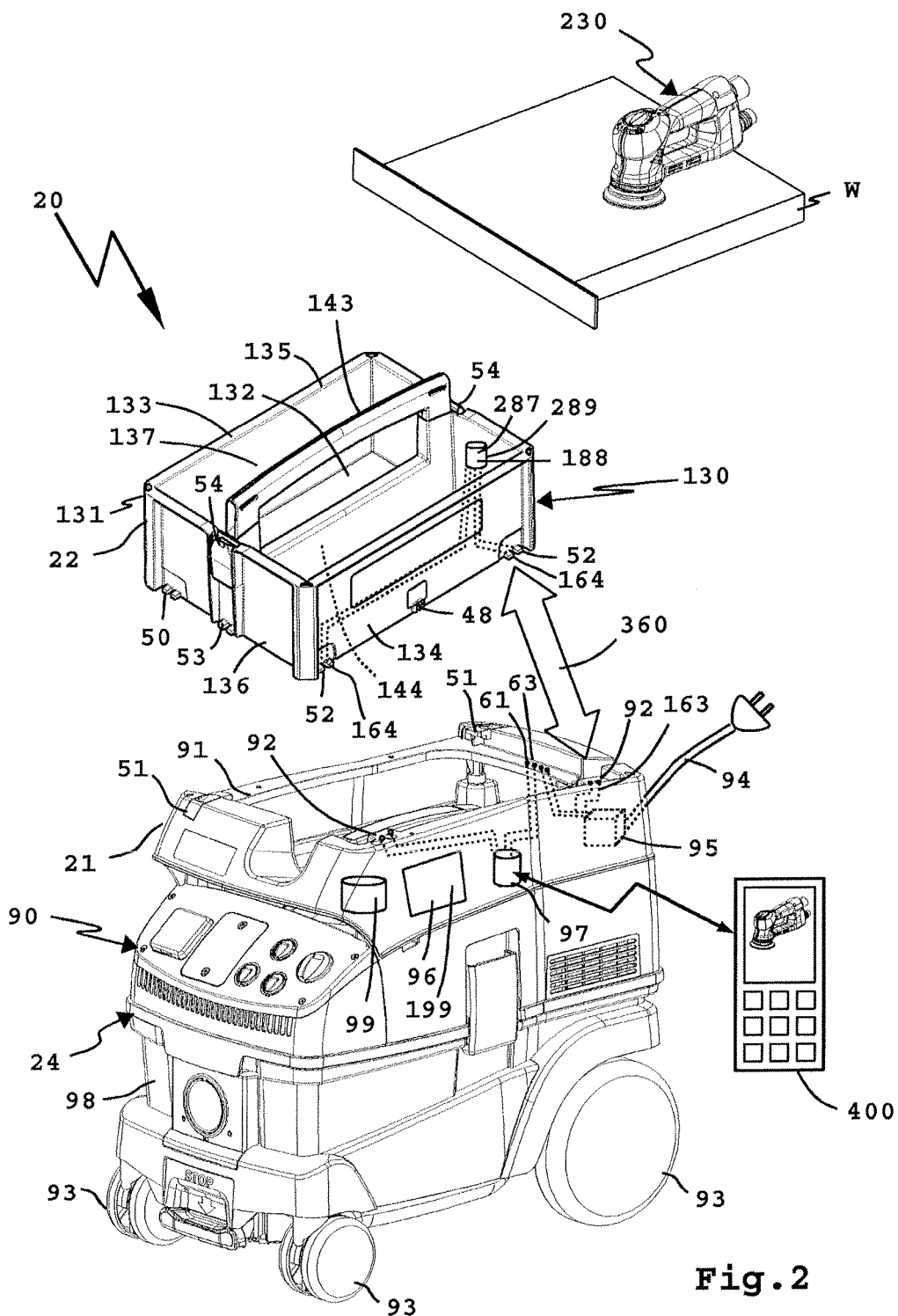
FIG. 2 shows an arrangement of not yet stacked stack elements, i.e. a vacuum cleaner as stack base, a transport container and a power tool for storage in the transport container, but in the process of machining a workpiece.

The arrangement according to FIG. 2 represents a not yet stacked stack arrangement 20, in which a vacuum cleaner 90 forms a first stack element 21 and a transport container open at the top forms a second stack element 22; these can be stacked on top of one another and firmly but releasably joined to one another. The vacuum cleaner 90 or the bottom stack element 21 respectively forms a stack base 24.

It is easily possible to place the stack element 22 on top of the stack element 12 or 13, for example, or on top of the stack base 14, or in a reverse arrangement to place the two stack elements 12 and 13 on top of the other stack base 24, i.e. the vacuum cleaner 90.

The stack elements 11, 12 are designed as transport containers 30. A container body 31 of a transport container 30 has a base wall 32, for example, from which project as circumferential side walls 33 a front side wall 34, a rear side wall 35 and two side walls 36 extending between these two side walls. The side walls 34, 35, 36 bound a stowage receptacle 37 suitable for transporting items like tools, nails or the like, in particular, however, for transporting a hand-operated power tool 200, which is located in the stack element 12, or a hand-operated power tool 260, which is located in the stack element 13. Another implement can obviously also be transported in this way, for example a hand-operated power tool 230, which is shown in FIG. 2 by way of example while machining a workpiece W.

The stack element 22 is represented by a transport container 130, the container body 131 of which has a stowage receptacle 137 which is open at the top. The stowage receptacle 137 is bounded by a base wall 132 as well as circumferential side walls 133. A front and a rear side wall 134, 135 are joined to one another by narrower side walls 136.

It can be seen that the external circumferential contours of the container bodies 131 and 31 are substantially identical and that the transport container 130 can be stacked on top of the transport container 30 or on top of either of the two stack bases 14 or 24 as well.

The stowage receptacle 37 can be closed by a cover 40 hinged to the rear side wall 35 by means of a pivot bearing 40a. The cover 40 has a cover wall 41, from which circumferential side walls 42 project, their circumferential contour matching that of the circumferential side walls 33 of the container body 31. The end faces of the circumferential side walls 42, 33 can therefore be brought directly into congruence with one another. The cover 40 is further provided with a pivotable handle 43, which can be pivoted into a position of non-use in which it dips into a recess 44 while projecting upwards beyond the cover 40 or the cover wall 41 in the manner of a carrying handle in a position of use.

The transport container 130 likewise has a carrying handle, i.e. a rigid handle 143, which projects upwards beyond the stowage receptacle 137. Acting as a holding contour, the handle 143 can engage with a handle receptacle 144 of a transport container stacked on top of the transport container 130, which is similar with regard to the handle receptacle 144. This being so, several transport containers 130 can be stacked on top of one another in a positive-locking arrangement.

The recess 44 of the cover 40 further features an engagement-from-behind contour 45, which can be engaged from behind by hook-shaped feet 45a on the base walls 32, 132, which are usually not visible in the drawing. These feet 45a can, as it were, hook into engagement with the engagement-from-behind contour 45, so that a positive-locking arrangement relative to a stacking direction S is obtained in the rear region of a respective transport container 30 and the transport containers are joined to one another in a manner resistant to tension in the stacking direction S.

The positive-locking feature of the engagement-from-behind contour 45 expediently acts transverse to the stacking direction S as well, at least in one direction. Furthermore, transverse to the stacking direction S feet 45b provided on the undersides of the stack elements can engage with recesses 45c on the top sides of the stack elements, for example on their cover, thereby providing resistance to shear or displacement transverse to the stacking direction S as well. The stack elements 11-13 are, for example, first hooked into the engagement-from-behind contour 45 transverse to the stacking direction S using the hook-shaped feet 45a and then pivoted downwards, so that the base walls 32, 132 come to lie on the top side of the respective lower stack element, the feet 45b engaging with the recesses 45c.

The feet 45b and the recesses 45c should be considered as positive-locking projections and positive-locking recesses, which provide a positive hold for stacked stack elements transverse to the stacking direction S. At this point, it should be noted that the hook-shaped contour of the feet 45b represents an optional variant which additionally provides resistance to tension for the stack elements relative to the stacking direction S. It would be easily possible to provide positive-locking contours between the stack elements of a stack arrangement according to the invention in the stacking or plug-in direction only, which would provide a positive hold transverse to the stacking direction but no resistance to tension along the stacking direction.

The tension-resistant connection of a transport container 130 to a further transport container 130 or of a transport container 130 to a transport container 30 placed below is provided in the front region, i.e. in the region of the front side wall 34 or front wall, by a coupling element or lock element 46 hinged to the respective cover 40 by means of a pivot bearing 47. The lock element 46 can be brought into or out of engagement with abutment contours 48 in the lower region of the front side wall 34, 134 of a respective transport container 30, 130 by rotation about the axis of rotation of the pivot bearing 47 and in this way provides a tension-resistant coupling for the transport containers 30, 30 or 30, 130 relative to the stacking direction S. In the upper region of a respective front side wall 34, further abutment contours 48 are expediently provided, which likewise positively encompass or engage from behind the lock element 46 in its coupling position or locking position, so that the lock element 46 joins the abutment contours 48, 49 to one another while bridging the cover 40 in a manner of speaking.

Like abutment contours 50, 52 provided on the side walls 34, 134, 36, 136, the abutment contours 48, 49 are designed in the shape of positive-locking projections or abutment cams. The abutment contours 50 of the transport containers 30, 130 are used to establish connections to links 51, for example, which are provided on the stack base 24, i.e. the vacuum cleaner 90.

The links 51 are located in an edge region of a container receptacle 91 on the top side of a housing 98 of the vacuum cleaner 90.

On the container receptacle 91, there are further provided engagement-from-behind contours or plug-in receptacles 92, with which the abutment contours 52 located on the front side walls 34, 134 of the transport containers 30, 130 can engage transverse to the stacking direction S. The abutment contours 52 are further suitable for attaching links in the manner of the links 51, which are not shown in the drawing. The transport container 30 or 130 is therefore inserted endwise into the plug-in receptacle 92. for example and then coupled to the links 51 in a manner resistant to tension in the stacking direction S.

Further abutment contours 53 and links 54 are provided on the transport container 130, approximately in the transverse centre of the respective side wall 136. If the handle 134 now engages with the handle receptacle 144 of a further transport container of the type of the transport container 130, which is placed above the transport container 130, the links 54 of the lower transport container 130 can be brought into engagement with the abutment projections or abutment contours 53 of the upper transport container, for example by being pivoted from the side and hooked.

On the underside of its housing 98, the vacuum cleaner 90 is provided with castors 93 for travelling on a base. The vacuum cleaner 90 is supplied with power via a mains cable 94. A vacuum cleaner 90 operated with a battery or another energy store would be easily conceivable as well. Via the mains cable 94, for example, a suction device (not shown in the drawing) of the vacuum cleaner 90 can be supplied with electric energy. The mains cable 94 further leads to a power supply device 95, which provides current conversion. The power supply device 95 supplies a display 96 and/or a control unit 99 of the vacuum cleaner 90, for example. It is further expedient if the power supply device 95 supplies a coupling device 97 with electric energy, for example with a DC voltage of 5-18 V (the mains voltage supplied via the mains cable 94 is between 120 V and 230 V AC as a rule).

As mentioned above, the vacuum cleaner 90 forms a stack base 24. Accordingly, the power supply device 95 and the coupling device 97 can be used for the stack elements stacked on top of the stack base 24 as well, for example for the stack element 21, but also for the other stack elements 12, 13, which will become clear later. For the moment, we shall deal briefly with the stack base 24, which may be designed as a supporting plate, for example. The stack base 14 could, however, easily be used as or located on a shelf base as well.

The stack base 24, which may be plate-shaped, for example, or have a plate-shaped base body, comprises a power supply device 195, which can be connected via a mains cable 194 to a power supply network with an AC or DC voltage, for example 230 V or 120 V. The stack base 24 comprises a coupling device 197, which facilitates data transmission from and/or to the stack base 14, as well as via a bus connection 60 and/or a bus connection 160 to the stack base 14, which will be described in greater detail later.

The bus connection 160 is a wireless bus connection, while the bus connection 60 is line-based or implemented by way of contacts.

The bus connection 60 is provided via bus interfaces 61, 62 of the stack arrangement 10. On its top side, which is suitable for placing a respective stack element 12, 13, 22, the stack base 14 has bus contacts 63, for example contact surfaces which are stationary and immovable on a surface of the top side of the stack base 14, or, in a particularly preferred embodiment, movable, in particular spring-loaded, contact surfaces 65, so that a secure contact can always be established to bus contacts 64 of the corresponding bus interface 62 on the underside of a respective stack element 12, 13, 22. Contact surfaces 66 of the bus contacts 64 can obviously likewise be immovable or spring-loaded or designed as contact pins.

At the interface between the stack elements 12, 13, a version of bus contacts as plug connectors is indicated. Plug connectors 67 are there, for example, inserted into sockets 68 of the respective other stack element 12 or 13. An insertion direction of the plug connectors 67 and the sockets 68 is preferably parallel to the stacking direction S, so that the bus connection 60 is established as soon as the stack elements 12, 13 are stacked on top of one another.

The arrangement is preferably designed such that the plug connectors 67 are mounted movably, for example, so that they can be pivoted or pushed into a position of non-use if not needed, in which position they do not project beyond an external surface of a respective transport container 30. It is, however, also conceivable for the plug connection to be provided in a protected region, which may, for example, be represented by a recess, so that any potentially protruding plug contacts are mechanically protected against damage.

It is further possible to provide, for example between a respective cover 40 and the container body 31, a releasable contact connection with e.g. contact surfaces 69; at this point, it should be noted that a flexible cable between the container body 31 on the one hand and the cover 40 on the other hand would, for example, facilitate a reliable bus connection 60 as well.

The lock elements 46 are also suitable for establishing the bus connection 60. Contacts 76 could, for example, be provided on the lock elements 46 and bus contacts 63$a$ and 63$b$ on the abutment contours 48, 49; these could be connected to one another in the locking position of the lock element 46. The contacts 76 are connected to one another via at least one line 75.

The bus connection 60 comprises bus lines 70, which may lead into the cover 40 and the respective container body 31, for example. The bus connection 60, which can also be described as a bus, further has connecting contacts 71, which represent a feed-in interface 72 and a communication interface 73 of the bus connection 60. To the connecting contacts 71, it is therefore possible to connect, for example, a computer 300 not described in detail via a suitable connecting cable for individual communication or energy transmission or both via the bus line 70.

Bus lines 70$a$ are, for example, provided for electric energy supply via the bus connection 60. The bus lines 70 can be supplied with electric energy, for example an AC supply or the like, directly by the power supply device 95. A DC voltage of relatively high amperage is also advantageously provided via the bus lines 70$a$. It is further possible to feed electric energy into the bus lines 70$a$ via the feed-in interface 72.

In the illustrated embodiment, a provision device 74 is provided which may, for example, convert the mains voltage provided via the mains cable 194, which has already been smoothed or transformed in its voltage by the power supply device 95, into a relatively low DC voltage of e.g. 12 V or 24 V.

The stack base 14 could also have a fixed or exchangeable energy store 174 on board, which directly supplies the provision device 74 with electric energy via the bus lines 70$a$, for example. The energy store 174 can be an electric battery or a buffer battery.

The bus lines 70$b$ are provided for data communication with the stack elements 12, 13, a field bus or the like being expedient in this context. A serial data transmission via the bus lines 70$b$ is therefore preferred but not mandatory, because parallel coupling and data transmission via further bus lines 70 not shown in the drawing would obviously be possible as well.

The bus or bus connection 160 for wireless communication comprises, for example, a coupling device 197, with which wireless communication, for example with a smartphone or another mobile communication device 400, is possible. The communication device 400 comprises inputting means 401, for example, e.g. a touch screen or a keypad, as well as display means 402 for data output, in particular for a graphic user interface, and a processor 403. On board of the communication device 400, there is further a wireless interface 405 for wireless communication with a wireless interface 198 of the coupling device 197. At the display means 402, the hand-operated power tools 200, 230, 260 and/or data thereof can be displayed graphically, for example.

The bus connection 160 comprises the coupling device 197 as a quasi bus head as well as bus couplers 190, which are parts of the transport container 30. The bus couplers 190 are, for example, located in the respective stowage receptacle 37, in particular in its edge region. They could also be located in a section of the circumferential side walls 33. In the case of the transport container 130, at least one bus coupler 190 could obviously be installed or integrated into one of the circumferential side walls 33 as well in a manner not shown in the drawing.

The bus couplers 190 are designed for wireless data and/or energy transmission between stack elements. The bus couplers 190 are preferably designed as transmitters, being capable of transmitting data and/or energy from one stack element to the next. It is also possible for one bus coupler 190 to be the first or last station of a bus, i.e. a bus head in a manner of speaking.

The diagrammatic representation of the drawing already shows that the bus couplers 190 are expediently in mutual alignment with respect to the stacking direction S or a stacking axis. This makes for a particularly favourable transmission path for wireless, e.g. inductive or radio, transmission. Transmission coils of bus couplers 190, for example, are in alignment with one another or cover one another in immediately adjacent stacked stack elements. In adjacent stacked stack elements, for example the stack elements 12, 13, coupling means 191, 192 provided for communication or for data or energy transmission, such as aerials, electric coils or the like, are arranged immediately adjacent to and in alignment with one another. This provides for optimum efficiency, for example in energy transmission, or improves data security or data quality in data transmission. A locally close and/or aligned arrangement of coupling means is obviously advantageous at other points of the stack arrangement 10 as well, for example between the stack base 14 and the stack element 12.

The coupling device 197 comprises, for example, a central bus controller 196, the wireless interface 198 for communication with the communication device 400 and a wireless interface 193 for communication with the bus couplers 190. Although the wireless interfaces 193, 198 may serve similar buses, for example Bluetooth buses, it is advantageous if, for example for internal communication on the bus connection 160, a first data or bus protocol, e.g. Bluetooth, is used, while communication with the communication device 400 is based on a second data or bus protocol, e.g. WLAN (wireless LAN).

The bus couplers 190 can further use the above-mentioned first data or bus protocol provided for communication via the bus or bus connection 160, while using a further data or bus protocol, e.g. a proprietary data or bus protocol, meeting special security requirements for communication with one of the hand-operated power tools 200, 230, 260, for example.

The bus couplers 190 or at least one bus coupler 190 can further comprise wireless energy transmitters, e.g. inductive transmitters, for supplying the transport containers 30 or the hand-operated power tools placed therein with electric energy.

At least one bus coupler 190 can contain or comprise a machine interface for direct communication with one of the hand-operated power tools 200, 230, 260, for example, and/or for charging its energy store. The machine interface can, for example, have electric contacts for connection to a service interface of a respective power tool 200, 230, 260. It is, however, also possible for at least one bus coupler 190 to have a machine interface for wireless communication with a service interface of a respective power tool 200, 230, 260.

It is further possible for at least one bus coupler 190 to be connected to such a machine interface, which is not integrated, however.

Using the transport containers 30, 130 and the bus connections 60, 160, operating data of the hand-operated power tools 200, 230, 260 can be read, for example, new parameters can be loaded and/or, which is particularly advantageous, energy stores of the hand-operated power tools 200, 230, 260 can be charged.

The transport containers 30 are equipped particularly suitably for this purpose. The transport containers 30 accommodate fixed or releasable container inserts 80, 180, the external contour 81 of which fits optimally into an internal contour 55 of the stowage receptacle 37. The stowage receptacle 37 is approximately rectangular in cross-section, for example. The external circumferential contour 81 fits optimally into the internal circumferential contour 55, so that the container inserts 80, 180 are supported on the circumferential side walls 33. The container inserts 80, 180 can therefore simply be inserted into the respective stowage receptacle 37 from above.

Figure 4:
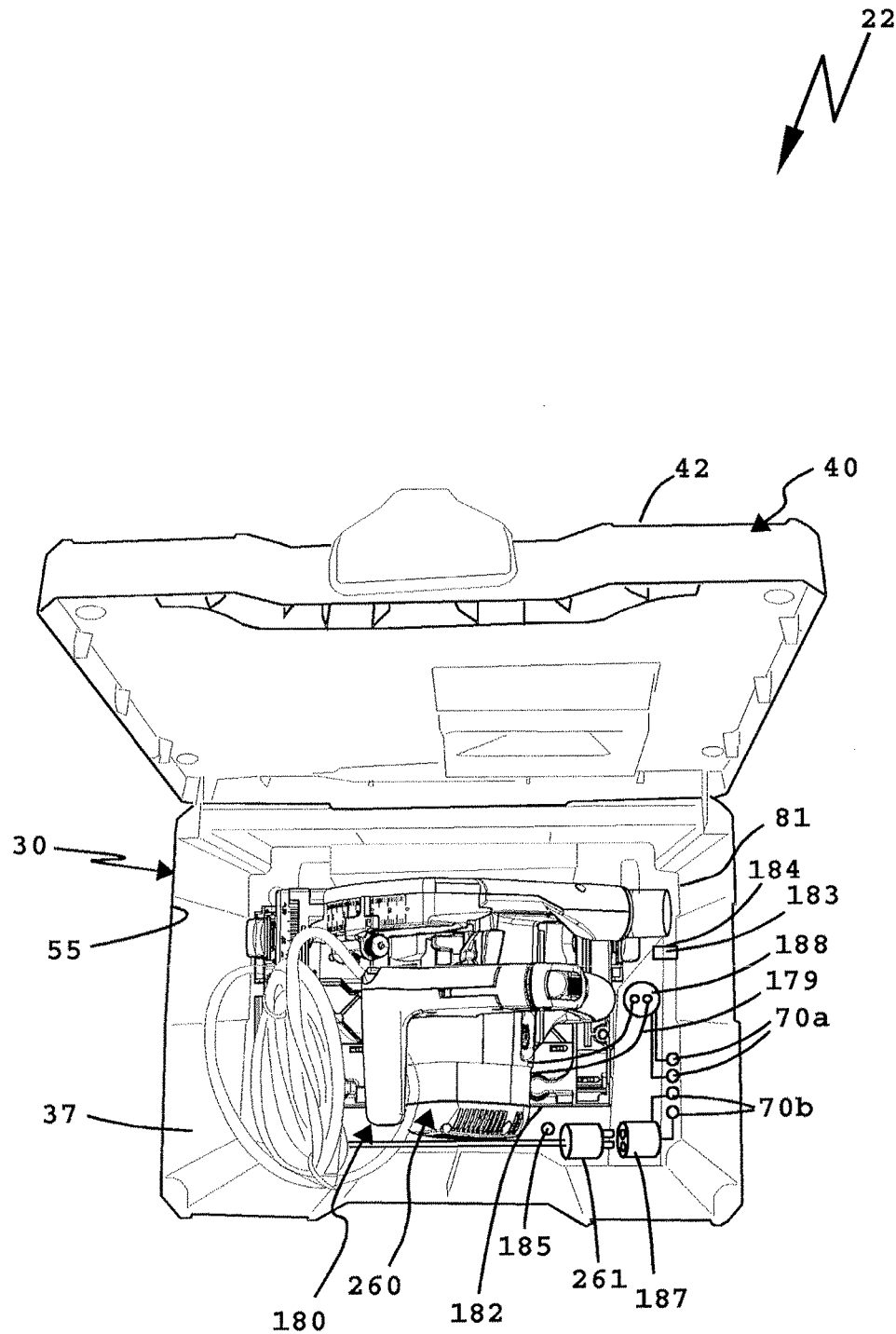
FIG. 4 shows a further transport container of the stack arrangement according to FIG. 1 with a hand-operated power tool provided for mains operation, in this case a saw.

As an alternative or in addition to this positive-locking arrangement, a container insert 80, 180 can conceivably be bolted and/or latched and/or locked into the respective stowage receptacle 37, e.g. using a lock or a spring-loaded latch 183 (FIG. 4), which forms a fastening means 184. At least one lock or one latch, e.g. the latch 183, projects from one of the circumferential side walls 133 inwards into the stowage receptacle 37. It is also possible for a container insert 80, 180 to be secured in the stowage receptacle 37 by a screw, e.g. a screw 185, which passes through the container insert 80, 180 and is tightened into the base wall 32 or into a screw dome thereof.

Within one of the stowage receptacles 37, supporting walls or the like can obviously be provided, for example, for the stationary location of a respective container insert 80, 180.

In the container insert 80, a machine receptacle 82 for accommodating the hand-operated power tool 200 is provided, for example. The machine receptacle 82 positively retains the hand-operated power tool 200. In the other container insert 180, the machine receptacle 182 has an internal contour matching the hand-operated power tool 260, so that this can be held positively as well. Other holders or receptacles can obviously be provided on the container inserts 80, 180, for example for a spare energy store 203 of the hand-operated power tool 200, which, in contrast to a further energy store 202, is not secured to the housing 201 of the hand-operated power tool 200, but at a distance therefrom in the container insert 80.

To charge the energy stores 203, 202, a charging station 87 is provided which is, for example, directly coupled to the line-based bus 60, in particular to the bus lines 70b, or by wireless, e.g. inductive, means to the bus 160. A bus coupler 190 can communicate with the charging station 87, for example.

A variant of a transport container 30, which is not shown, can in principle provide that the container insert 80 is stationary in the stowage receptacle 37, even being an integral part of the transport container in particular.

Expediently, however, it is provided that the container insert 80 is removable from the stowage receptacle 37, i.e. being held releasably therein, so that a permanent connection to the bus lines 70 is hardly expedient. For this purpose, the container body 31 of the transport container 30 is provided with contacts 83, which form a part of an insert interface 84. The contacts 83 are connected to contacts 85 of a body interface 86 of the container insert 80 if it is inserted into the stowage receptacle 37. An electric connection is then established between the bus interface 61, 62 on the one hand and the container insert 80 on the other hand. The contacts 83, 85 are electric contacts and may, for example, be spring-loaded and/or designed as plug connectors (socket and plug). In the drawing, the contacts 83, 85 are arranged on top of one another, so that their releasability cannot easily be recognised.

A plug-in axis of the contacts 83, 85, if designed as plug connectors, extends e.g. parallel to the insertion direction in which the container insert 80 is inserted into the stowage receptacle 37 at its top opening, i.e. in the stacking direction S in the illustrated embodiment. This plug-in axis could be oriented in a different way, e.g. if one of the plug connectors is located on a flexible cable.

The bus lines 70*a* therefore supply the charging station 87 with electric energy, enabling it in turn to charge the two energy stores 202, 203, e.g. battery packs.

The bus lines 70*b*—the data lines—are connected to a wireless communication interface 88 of the container insert 80, for example. A direct wireless connection to the wireless communication interface 88 would obviously be possible as well, i.e. via the other bus 160. It is in any case possible for the communication device 400 and/or the computer 300 to communicate with a service interface 205 of the hand-operated power tool 200 via one or both of the bus connections 60, 160 and finally via the communication interface 88, which forms a part of a machine interface 89. As a result, operating parameters of the hand-operated power tool 200 can be read at the communication device 400 or even preset, for example. Service intervals or the like can also be checked easily in this way.

The wireless communication interface 88 is also suitable for identifying and/or locating the hand-operated power tool 200, therefore forming an identification and location device.

A fan 77, which can be supplied with electric energy via the bus lines 70*a*, for example, forms a cooling device for the hand-operated power tool 200 and/or the energy stores 202, 203.

In contrast to the container insert 80, the container insert 180 is designed for line-based communication with the hand-operated power tool 260. The bus lines 70*a* are, for example, connected via contacts (not shown) of a body interface 86 of the container body 31 and of an insert interface 84 of the container insert 180 to a socket 187, into which a mains plug 261 of the hand-operated power tool 260 can be inserted.

The bus lines 70*b* are, for example, releasably connectable to one another via contacts (likewise not shown) of the body interface 186 and the insert interface 84 of the container insert 180 and can at any rate be connected to one another electrically. A communication interface 188, which is connected to the bus lines 70*b* in this way, is connected, via cables 179 for example, to a service interface 265 of a controller, a memory or the like of the hand-operated power tool 260.

Figure 3:
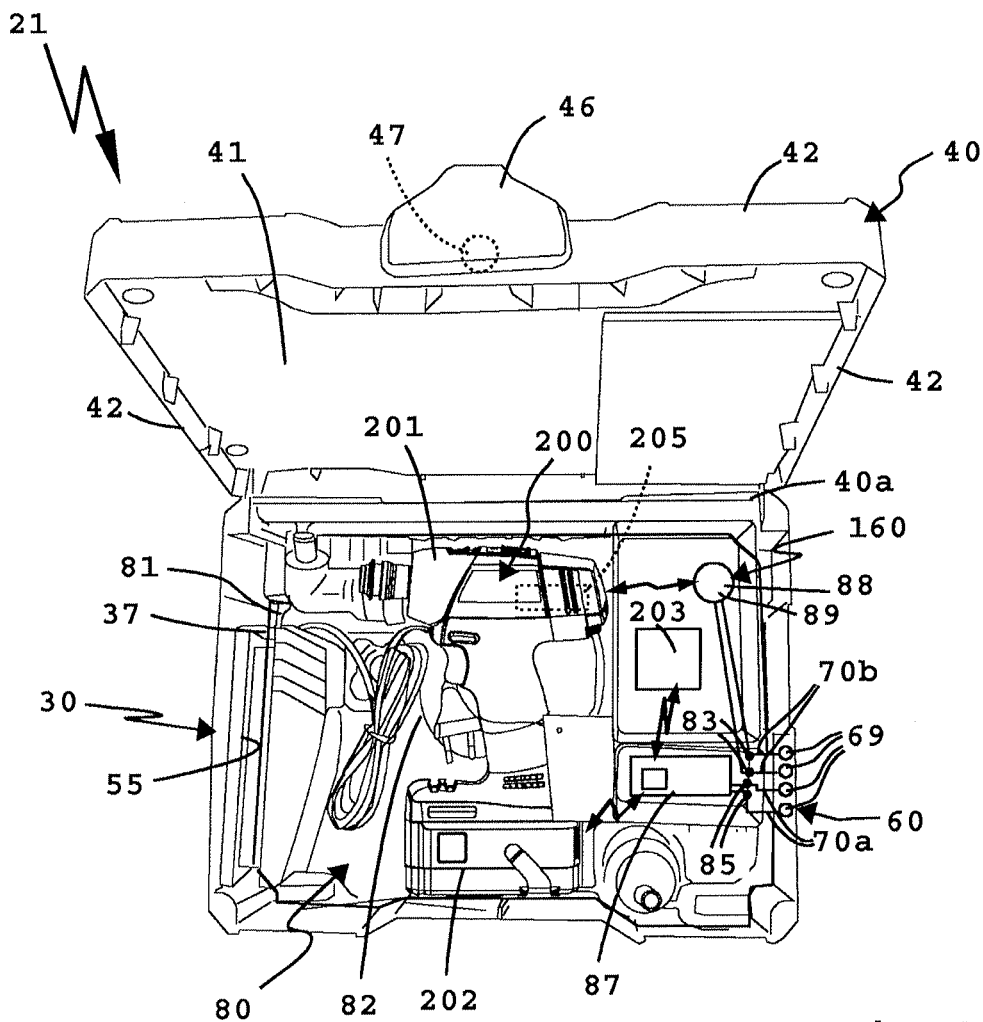
FIG. 3 is a top view of a first transport container of the stack arrangement according to FIG. 1 with a battery-driven hand-operated power tool, in particular a screwdriver.
Figure 5:
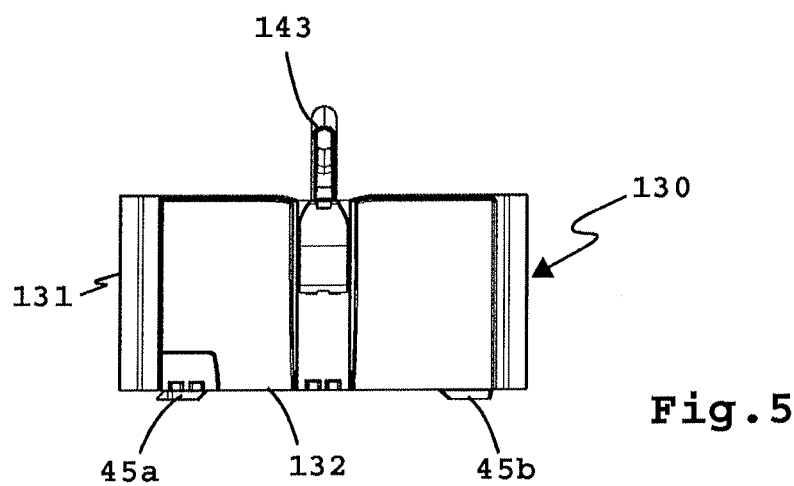
FIG. 5 is a side view of the transport container according to FIG. 2.

It would also be possible for the container insert 180 to have the contacts 85 of the body interface 86, so that it can be connected to the contacts 83 of the transport container 30 from FIG. 3.

The comfortable operation of the arrangement becomes even clearer in the context of FIG. 1, i.e. operating parameters of all hand-operated power tools stored in the stack arrangement 10—the hand-operated power tool 230 is shown by way of example—can be read, parameterised or the like centrally at the communication device 400, for example.

At the transport container 130, a machine interface 289 is provided in the form of a charging station 287 or of a communication interface 188 designed for data transmission from and/or to a hand-operated power tool. The machine interface 289 preferably facilitates a wireless communication of a hand-operated power tool, e.g. the hand-operated power tool 230. If this is placed in the stowage receptacle 137, it can, for example, be supplied with electric energy via the machine interface 289, e.g. for charging an energy store/battery.

The machine interface 289 can be connected to the stack base 24 or the vacuum cleaner 90 via a bus 360. A plug receptacle 92 and the associated abutment contours 52 of the transport container 130 have electric bus contacts 163, 164, for example, thereby forming bus interfaces which come into contact when the transport container 130 is placed in the container receptacle 91, so that the machine interface 289 is connected to the power supply device 95, e.g. for the energy supply of the hand-operated power tool 230 or the coupling device 97.

The brackets 51 and the associated abutment contours 50 may also have bus contacts suitable for establishing a bus connection between stack elements.

The coupling device 97 facilitates via the bus connection 160 the communication between the communication device 400 or the computer 300 and the hand-operated power tool 230, for example.

A stack base or stack element of a stack arrangement which is connected to at least one further stack element via a bus connection can comprise a user interface which can be coupled to the bus connection. The display 96 of the vacuum cleaner 90 can, for example, be provided for the display of data received via the bus 160. It is also possible that data or queries can be input at the display 96, i.e. that the display 96 provides a graphic user interface for an element coupled to the bus 360, e.g. the hand-operated power tool 230 and/or the vacuum cleaner. The display 96 therefore forms a control device 199.

A control device can also be provided on a stack element other than the stack base. The stack element 22, for example, has a display 296, e.g. on its cover. The display 296 is connected to the machine interface 89 or 189, so that images or operating data of the hand-operated power tool 200, 230 or 260 can be seen on the display 296.

The coupling device 97 and the power supply device 95 are expediently likewise connected to the bus contacts 63, which provide compatibility with the bus 90. The stack base 24 or the vacuum cleaner 90 has a bus interface 61 as well.

The invention claimed is:

1. A stack arrangement having at least two stack elements, which can be stacked on top of one another in a stacking direction, of which at least one is represented by a transport container having a container body and a storage receptacle with a machine receptacle for an electric or pneumatic hand-operated power tool, wherein the stack elements have bus interfaces for transmitting data and/or energy between the stack elements of the stack arrangement, wherein the bus interfaces form a bus connection in a side wall section of the container body and communicate between the stack elements when the stack elements are stacked on top of one another or in the stacked state of the stack elements; and the bus connection having a feed-in interface and configuring to connect to an external computer, wherein at least one stack element of the stack arrangement has mutually connected bus interfaces, provided for communication with a stack element placed below or above, so that the stack element located in the stack arrangement establishes the bus connection between the upper and the lower stack elements, and wherein the bus interface of the transport container is connected to a machine interface for the connection of a service interface of the hand-operated power tool, and wherein the machine receptacle is provided in a container insert, which is supported on a base of the storage receptacle and is securable against a movement along the base using fastening means, and is supported on at least one circumferential side wall laterally bounding the storage receptacle, wherein connecting means which are connected to the bus interface when the container insert is placed in the storage receptacle are provided on the container insert for establishing the connection between the machine interface and the service interface of the hand-operated power tool.

2. The stack arrangement according to claim 1, wherein the machine interface is provided for transmitting data or electric energy or compressed air.

3. The stack arrangement according to claim 1, wherein the machine interface comprises a wireless transmission interface for the wireless transmission of data and/or energy and/or connecting contacts for establishing a contact-based connection to the hand-operated power tool.

4. The stack arrangement according to claim 1, wherein at least one bus interface provided between two stack elements comprises a wireless bus interface provided for data and/or energy transmission or a wireless bus interface provided for data transmission or energy transmission only.

5. The stack arrangement according to claim 1, wherein the bus interfaces provided for wireless transmission of energy, are in alignment with one another in the stacked state of the stack elements, and/or wherein coupling means of stacked stack elements, which are designed for wireless communication, are located on walls or in wall regions of the stacked stack elements, which are immediately opposite one another and/or are held in a stable position relative to one another by coupling means connecting the stack elements in a manner resistant to tension in the stacking direction and/or by positive-locking contours of the stack elements providing positive engagement transverse to the stacking direction.

6. The stack arrangement according to claim 1, wherein the bus interfaces comprise electric contact surfaces, which are located on plug connectors, on the top side of a lower stack element and on the underside of an upper stack element stacked on top of the former, which contact surfaces are oriented on the respective underside or top side in such a way that they establish the bus connection as the stack elements are stacked.

7. The stack arrangement according to claim 1, wherein a plug-in axis of the plug connectors extends parallel to the stacking direction, so that the plug connectors can be plugged into one another by stacking one stack element on top of another stack element.

8. The stack arrangement according to claim 1, wherein the bus interfaces comprise at least one link, which joins an upper stack element to a lower stack element of the stack arrangement and is in the assembled state joined to a side wall section of the container body of the upper stack element and to a side wall section of the container body of the lower stack element.

9. The stack arrangement according to claim 8, wherein the at least one link is movably mounted on one of the stack elements or comprises plug-in means for plugging into at least one of the stack elements.

10. The stack arrangement according to claim 8, wherein the at least one link comprises a rotatably mounted lock element, which locks together two stack elements in a locking position and releases the stack elements in a release position, wherein the lock element is in electric contact with bus contacts of the stack elements joined by the lock element and electrically connects them in the locking position and is out of contact with the bus contacts in the release position and/or positions transmission means of the stack elements designed for wireless data or energy transmission in the locking position relatively closer to one another than in the release position.

11. The stack arrangement according to claim 1, wherein at least one of the stack elements has a wireless or line-based connection for an electric energy network, for feeding electric energy and/or compressed air into the bus connection and/or a communication interface, which comprises a plug connector for the wireless or line-based connection of the bus connection to a local area network, and/or for communication with a control.

12. The stack arrangement according to claim 11, wherein the feed-in interface comprises a transformer, for the provision of a supply voltage suitable for an electric hand-operated power tool stored in the stack arrangement using the electric energy or compressed air fed in via the feed-in interface.

13. The stack arrangement according to claim 1, wherein at least one of the stack elements of the stack arrangement comprises an exchangeable energy store for the provision of electric energy on the bus connection and/or a control for controlling data input and/or data output, at least one hand-operated power tool stored in a transport container and connected to the bus connection.

14. The stack arrangement according to claim 1, wherein the at least one transport container comprises at least one charging station, which is wireless or has charging contacts for a hand-operated power tool, and/or a battery pack, which is separate from the hand-operated power tool.

15. The stack arrangement according to claim 1, wherein the at least one transport container comprises at least one sensor for the detection of a number of operating hours and/or a service interval and/or information on a malfunction and/or a charging state of an energy store of the hand-operated power tool, and/or wherein a sensor is provided in the transport container for detecting the amount of consumables present in the transport container.

16. The stack arrangement according to claim 1, wherein at least one stack element of the stack arrangement comprises a location device for the wireless location of the stack element or the stack arrangement using a control.

17. A stack arrangement comprising: a lower stack element having a bus interface disposed on a top side of the lower stack element; an upper stack element stacked on top of the lower stack element in a stacking direction and having a bus interface on an underside of the upper stack element, the bus interface of the upper stack element making electrical contact with the bus interface of the lower stack element to form a bus connection in a side wall section of the container body for transmitting data and/or energy between the upper and lower stack elements; and the bus connection having a feed-in interface and configuring to connect to an external computer, wherein at least one of the lower stack element and the upper stack element is a transport container, the transport container comprising: a container body defining a storage receptacle; a removable container insert supported within the storage receptacle, the container insert defining a machine receptacle and having an insert interface and a machine interface, the insert interface being releasably electrically connected to the bus interface of the transport container and the machine interface being electrically connected to the insert interface; and an electric or pneumatic hand-operated power tool received within the machine receptacle of the container insert, the hand-operated tool having a service interface for communication with the machine interface.

* * * * *